(12) United States Patent
Fritz et al.

(10) Patent No.: US 7,733,657 B2
(45) Date of Patent: Jun. 8, 2010

(54) MODULE BASE UNIT WITH STRAIN RELIEF MEANS

(75) Inventors: Reinhard Fritz, Vienna (AT); Gerald Schaffler, Vienna (AT); Joachim Schober, Vienna (AT)

(73) Assignee: NXP B.V., Eindhoven (NL)

( * ) Notice: Subject to any disclaimer, the term of this patent is extended or adjusted under 35 U.S.C. 154(b) by 710 days.

(21) Appl. No.: 11/572,871

(22) PCT Filed: Jul. 26, 2005

(86) PCT No.: PCT/IB2005/052504

§ 371 (c)(1),
(2), (4) Date: Jan. 29, 2007

(87) PCT Pub. No.: WO2006/013535

PCT Pub. Date: Feb. 9, 2006

(65) Prior Publication Data

US 2009/0190314 A1    Jul. 30, 2009

(30) Foreign Application Priority Data

Jul. 29, 2004 (EP) .................................. 04103656

(51) Int. Cl.
*H05K 1/14* (2006.01)
(52) U.S. Cl. ...................................... 361/737; 361/728
(58) Field of Classification Search ................ 361/737, 361/728, 733
See application file for complete search history.

(56) References Cited

OTHER PUBLICATIONS

W/O 03/071476 A1, Brugger, Christian Internaltion Application No. PCT/IB03/00357), Internation filing date Mar. 2, 2003.*

* cited by examiner

*Primary Examiner*—Hung S Bui
*Assistant Examiner*—Andargie M Aychillhum

(57) ABSTRACT

In a module base unit (1) for a module (30) for a data carrier, two connection plates (2, 3) are provided, which comprise electrically conductive material and which each have a direction of extent (4, 5) and which are separated from each other by a gap (16) transverse to the two directions of extent (4, 5), and at least one strain relief member (34) is connected to the two connection plates (2, 3), which strain relief member (34) is constructed to absorb tensile forces occurring parallel to the directions of extent (4, 5) and acting on the connection plates (2, 3).

15 Claims, 1 Drawing Sheet

MODULE BASE UNIT WITH STRAIN RELIEF MEANS

FIELD OF THE INVENTION

The invention relates to a module base unit for a module for a data carrier, which module base unit comprises two connection plates that consist of electrically conductive material and which each have a direction of extent and which are aligned relative to each other with their two directions of extent and which are separated mechanically and electrically from each other by a gap transverse to the two directions of extent.

The invention relates furthermore to a module for a data carrier, which module comprises a module base unit and a chip.

The invention relates furthermore to a data carrier having a module, which module comprises a module base unit and a chip.

BACKGROUND OF THE INVENTION

A module base unit conforming to the construction mentioned initially in the first paragraph and a module conforming to the construction mentioned initially in the second paragraph and a data carrier conforming to the kind mentioned initially in the third paragraph are known, for example, from the patent document WO 2002/095 673 A1. In the case of the known solutions, the circumstances are such that in the case of a completed module and in the case of a completed data carrier having a completed module, the two connection plates of the module, which have an elongate strip form, are mechanically joined to each other and held together only by means of a chip connected to the two connection plates and by means of a plastic covering enveloping the chip and part of the connection plates. The problem affecting this particular case is that on the appearance of tensile forces, which occur parallel to the longitudinal extent of the connection plates and act on the connection plates, the connection plates may be displaced parallel to their longitudinal extents and away from each other, giving rise to the risk that the electrically conductive connections between the chip and the two connection plates will be damaged or destroyed, including even the risk that the chip will fracture.

OBJECT AND SUMMARY OF THE INVENTION

It is an object of the invention to eliminate the above-mentioned problems and risks in a simple manner and to produce an improved module base unit and an improved module and an improved data carrier.

To achieve the object described above, in a module base unit in accordance with the invention inventive features are provided, so that a module base unit in accordance with the invention can be characterized in the manner specified hereafter, namely:

Module base unit for a module for a data carrier, which module base unit comprises two connection plates that consist of electrically conductive material and each have a direction of extent and which are aligned relative to each other with their two directions of extent and which are mechanically and electrically separated from each other by a gap transverse to the two directions of extent, wherein strain relief means are connected to the two connection plates, which strain relief means are constructed to absorb tensile forces occurring parallel to the directions of extent and acting on the connection plates.

To achieve the object described above, in a module in accordance with the invention inventive features are provided, so that a module in accordance with the invention can be characterized in the manner specified hereafter, namely:

Module for a data carrier, which module comprises a module base unit and a chip, the module comprising a module base unit according to the invention and the chip being electrically conductively connected to the two connection plates of the module base unit according to the invention.

To achieve the object described above, in a data carrier in accordance with the invention inventive features are provided, so that a data carrier in accordance with the invention can be characterized in the manner specified hereafter, namely:

Data carrier having a module, which module comprises a module base unit and a chip, the data carrier comprising a module according to the invention having a module base unit according to the invention, the chip being electrically conductively connected to the two connection plates of the module base unit according to the invention.

In a structurally simple and space-saving manner and with only minimal extra effort, by providing the features according to the invention the following can be achieved: in the case of tensile loads which occur in a completed module according to the invention and in a completed data carrier according to the invention and which act, parallel to the two aligned directions of extent of the connection plates, on the connection plates, the strain relief means ensure that no undesirable displacement of the two connection plates away from each other can occur, so that also no undesirably high mechanical loading can occur on the electrically conductive connections between the two connection plates and a chip electrically conductively connected to the two connection plates nor on the chip itself. It goes without saying that the protective function afforded by the strain relief means is ensured only within certain technical limits.

In the constructions according to the invention, the strain relief means can be connected by means of an adhesive joint to the two connection plates. It has proved especially advantageous, however, if the strain relief means are connected to the two connection plates in an interlocking manner. An especially good safety function is achieved in this way.

In the constructions according to the invention, the strain relief means can be of substantially rod-form or block-form construction, but this does gives rise to a relatively large overall height. It has therefore proved very advantageous for the strain relief means to comprise at least one planar strain relief member. Such a planar strain relief member is connected, running parallel to the connection plates, to the two connection plates, so that a low overall height is achieved. With regard to the smallest possible overall height, it is very advantageous if such a planar strain relief member is arranged on the same side of the connection boards as the chip, the planar strain relief member then being led past the chip.

In the constructions according to the invention with at least one planar strain relief member, the construction can be arranged such that an extension projects from each connection plate perpendicular to the plane of the plate, and extends into a passage in a planar strain relief member. In this case it is necessary to realize perpendicularly projecting extensions for the two connection plates, which necessitates an additional manufacturing step in the production of the connection plates. It has proved very advantageous, however, if the at least one planar strain relief member has at least two extensions projecting transversely to the plane of the member, of which extensions at least one extension is connected to the one connection plate and at least one extension is connected to the other connection plate in an interlocking manner. This construction offers the advantage that connection plates already in production and used for the manufacture of known module base units for known modules for known data carriers can be utilized in a simple manner and without additional manufacturing steps for co-operation with at least one planar strain relief member, so that connection plates known per se can be used for production of a module base unit according to the invention. This is advantageous in terms of lowest possible manufacturing costs.

In the constructions according to the invention, strain relief members of rectangular form or of oval form or of clamp-type form can be used. It has proved very advantageous if a planar strain relief strip is provided as strain relief member. It has also proved very advantageous if a planar strain relief ring is provided as strain relief member.

It should once more be mentioned at this point that the above-described advantages of the constructions according to the invention can be applicable to a module base unit and to a module as well as to a data carrier.

These and other aspects of the invention are apparent from and will be elucidated, by way of non-limitative example, with reference to the three embodiments described hereinafter.

DESCRIPTION OF EMBODIMENTS

Figure 1:
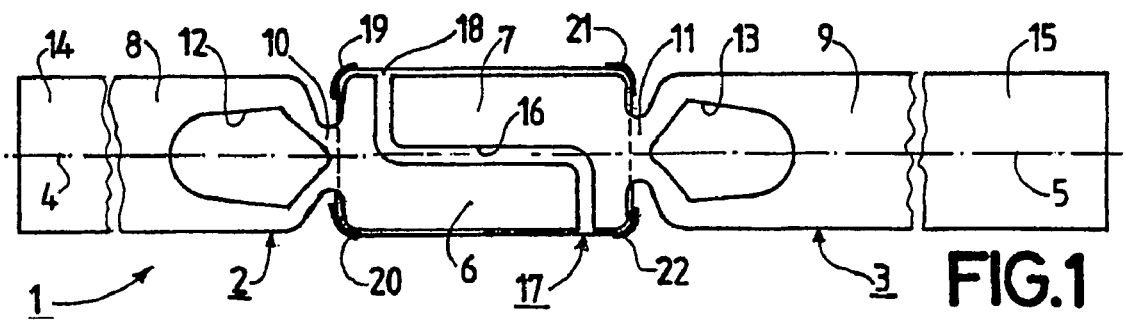
FIG. 1 shows, in plan view and to a scale larger than actual size, a module base unit according to a first embodiment of the invention.

FIG. 1 shows a module base unit 1. The module base unit 1 is provided and constructed for realization of a module, which module is provided for use in a data carrier. The module base unit 1 comprises two connection plates 2, 3. Each of the two connection plates 2, 3 consists of electrically conductive material, namely, substantially of copper, covered with a layer of tin. The connection plates 2, 3 can alternatively consist of a different material, for example, brass, silver or gold. Each of the two connection plates 2, 3 has a direction of extent, namely, a longitudinal direction 4, 5, which in FIG. 1 is indicated with a respective dot-dash line. The two longitudinal directions 4, 5 of the two connection plates 2, 3 are aligned relative to each other, in fact in the present case such that the two connection plates 2, 3 run flush with respect to each other. The connection plates 2, 3 are of the same form. The two connection plates 2, 3 comprise a first end region 6, 7. Each of the two end regions 6, 7 is of L-shaped form. Each of the two connection plates 2, 3 additionally comprises a middle region 8, 9, which is connected by way of a respective narrow connecting bridge 10, 11 to the first end region 6, 7. In each of the two middle regions 8, 9 there is provided a recess 12, 13, the function of which recess 12, 13 is to avoid flexural loading on the chip or to reduce it to the lowest possible level, which is achieved in that bending forces exerted on a data carrier and a module result in a bending of the connection plates, most notably in the two middle regions 8, 9 and in the regions of the narrow connecting bridges 10, 11, but there is no bending in the two first end regions 6, 7. Each of two connection plates 2, 3 comprises a second end region 14, 15, which merges into the relevant middle region 8, 9. The two second end regions 14, 15 are provided and constructed with mating contacts for electrically conductive connection. For example, the two second end regions 14, 15 serve for electrically conductive connection with a transmission coil of a data carrier for contactless communication by means of the transmission coil. The two connection plates 2, 3 are separated mechanically and electrically from each other by a gap 16 transverse to the two directions of extent 4, 5.

In the case of the module base unit 1, strain relief means 17 are connected to the two connection plates 2, 3. The strain relief means 17 are constructed to absorb tensile forces occurring parallel to the longitudinal directions 4, 5 and acting on the connection plates 2, 3. In the present case, the strain relief means 17 are formed, according to FIG. 1, by means of a strain relief plate 18 lying beneath the first end regions 6, 7 and by means of four arcuately extending bends 19, 20, 21, 22 protruding from the strain relief plate 18 towards the two first end regions 6, 7. By means of the bends 19, 20, 21, 22, the strain relief means 17 are connected in interlocking manner with the two connection plates 2, 3. In addition to this connection effective by interlocking, an adhesive joint can also be provided between the strain relief plate and the two first end regions 6, 7, this adhesive joint additionally increasing the already very good protective function against high tensile loads afforded by the interlocking connection. Alternatively, it is possible to provide just one strain relief plate 18 without bends as the strain relief means 17 and to connect the strain relief plate 18 formed without bends to the first two end regions 6, 7 by means of an adhesive joint. In the two abovementioned cases, the strain relief means 17 in any case comprise a planar strain relief member, namely, the strain relief plate 18. The bends 19, 20, 21, 22 form extensions projecting transverse to the plane of the strain relief plate 18, of which extensions two extensions are connected to the one connection plate 2 and two extensions are connected to the other connection plate 3 in an interlocking manner, in fact by virtue of the extensions formed by the bends 19, 20, 21, 22 engaging the two first end regions 6, 7 adjacent to the narrow connecting bridges 10, 11.

Figure 2:
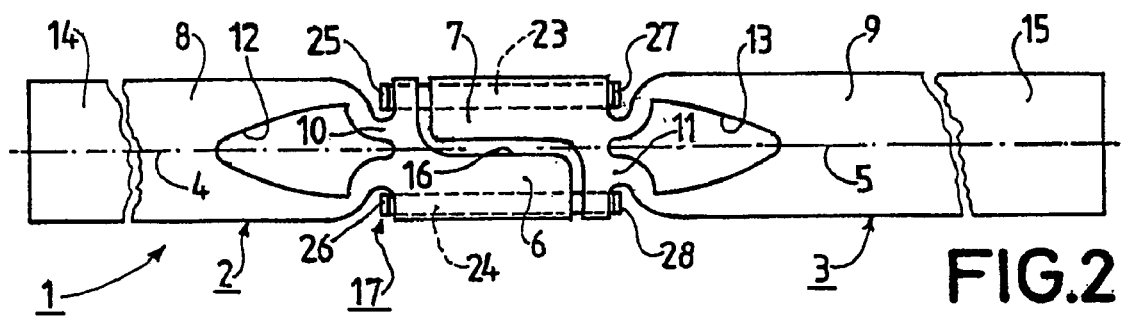
FIG. 2 shows in a manner similar to FIG. 1 a module base unit according to a second embodiment of the invention.

FIG. 2 also shows a module base unit 1, which has a construction like the module base unit 1 according to FIG. 1. In the case of the module base unit 1 according to FIG. 2, however, the strain relief means 17 are formed by means of two planar strain relief strips 23, 24, each strain relief strip 23, 24 comprising two tabs 25, 25, 27, 28—angled analogously to the bends 19, 20, 21, 22 in the case of the module base unit 1 according to FIG. 1—the tabs 25, 26, 27, 28 being connected to the first end regions 6, 7 in an interlocking manner.

Figure 3:
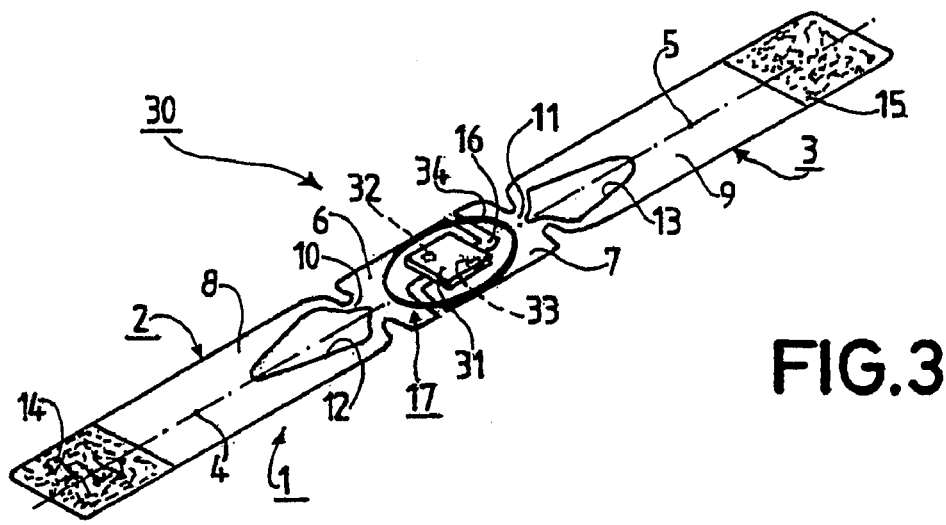
FIG. 3 shows a module according to the invention with a module base unit according to a third embodiment of the invention.

FIG. 3 shows a module 30 for a data carrier, which module 30 comprises a module base unit 1 and a chip 31. The chip 31 has two chip contacts 32, 33, which are electrically conductively connected to the first end regions 6, 7 of the module base unit 1 in what is called the flip-chip technique. In the case of the module 30 or rather the module base unit 1 of the module 30, a planar strain relief member 34 is likewise provided as strain relief means, which planar strain relief means 34 is formed by a planar strain relief ring. Four pins, not visible from FIG. 3, project from the strain relief ring perpendicularly towards the connection plates 2, 3. These four pins are received in four holes intended for that purpose in the two first end regions 6, 7 of the module base unit 1, an interlocking connection between the strain relief ring and the two connection plates 2, 3 being realized by means of the four pins. In addition to this interlocking connection, an adhesive joint with the two first end regions 6, 7 is also provided between the strain relief ring and its four pins.

Figure 4:
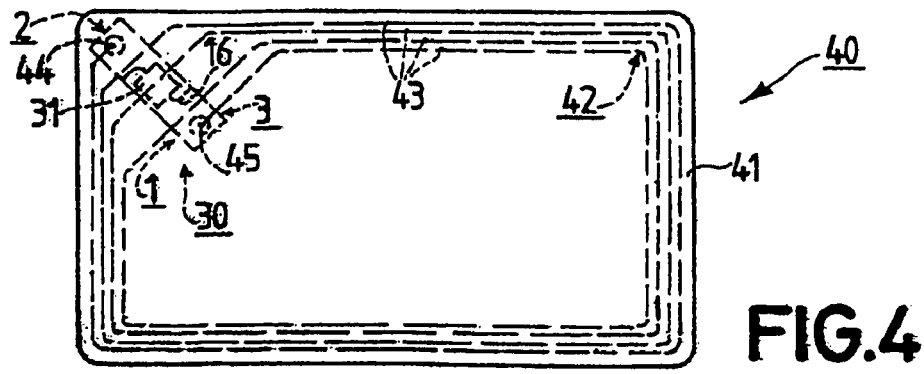
FIG. 4 shows a data carrier with a module according to the invention, which module comprises a module base unit according to the invention.

FIG. 4 shows a data carrier 40 which is provided and constructed for contactless communication with a communication station provided and constructed for that purpose. The data carrier 40 comprises a data carrier body 41, which is formed by films of plastics or paper joined to each other by laminating. The data carrier 40 may alternatively have been manufactured by means of an injection-molding process. A transmission coil 42 is received in the data carrier body 41, which transmission coil 42 comprises a plurality of coil windings 43 that extend between two coil terminals 44 and 45. The data carrier body 41 also receives a module 30, the two connection plates 2, 3 of which are electrically conductively connected to the coil terminals 44, 45. The module 30 is in this case electrically isolated with respect to the coil windings 43, by providing in known manner an electrically isolating layer between the module 30, or rather its connection plates 2, 3, and the coil windings 43.

In all the above-described embodiments, the strain relief means 17 ensure that high tensile loadings that act on the module base unit or the module 30 or the data carrier 40 do not lead to any damage or destruction.

The strain relief means 17 provided in the case of the above-described constructions, that is, the strain relief plate 18 with its bends 19, 20, 21, 22 and the strain relief strips 23, 24 with their tabs 25, 26, 27, 28 and the strain relief ring 34 with its pins (not shown), are manufactured from an electrically nonconductive material, namely preferably from a fiber-reinforced plastics material. Alternatively, instead of the reinforced-reinforced plastics material, an epoxy resin can be used. The strain relief means 17 can alternatively consist of metal, but then it must be ensured that the strain relief means 17 are electrically isolated from the connection plates 2, 3, which can be realized, for example, by means of an electrically isolating adhesive.

It should furthermore be pointed out that in the case of the construction according to FIG. 3, the strain relief means and the chip 31 are provided on the same side of the module 30. Compared with this, in constructions of a module with a module base unit 1 according to FIGS. 1 and 2, a chip to be connected to the relevant module base unit 1 is provided on one side of the module base unit 1, whereas the strain relief means 17 are provided on the other side of the relevant module base unit 1. In the construction of a module with a module base unit 1 according to FIG. 2, a solution can alternatively be chosen whereby a chip to be connected to the module base unit 1 according to FIG. 2 is connected to the connection plates 2, 3 on the same side of the module base unit 1 as the two strain relief strips 23, 24.

Also possible and very advantageous is a construction according to the invention which is designed such that the two connection plates 2, 3 are each provided with at least one passage, preferably with a plurality of passages, and on both connection plates 2, 3, except for at their two end regions 14, 15, a foil coated with an adhesive layer is provided, namely such that the two adhesive layers face each other and are connected, firstly, to the connection plates 2, 3 and, secondly, to each other in the region of the passages. Bonding of the two adhesive layers to the connection plates and to each other was achieved by previous warming and subsequent pressure application and by cooling and hardening. The adhesive joints of the two adhesive layers created right through the passages provided in the connection plates 2, 3 likewise produce interlocking connections, by means of which strong tensile forces, which act on the connection plates 2, 3, can be accommodated. Thus, by means of the two foils coated with a respective adhesive layer, highly effective strain relief means are realized in a simple and advantageous manner, which strain relief means can be connected to the connection plates both by means of adhesive joints and in an interlocking manner.

It should additionally again be mentioned that the module base units and modules described above are manufactured not in the form of separate parts but in band form, wherein what is known as a strip conductor is used as a starting point and what is known as a conductor frame is produced, in which a plurality of module base units lying side by side are realized. The module base units are then accordingly delivered in band form, that is, as what is known as tape or blister tape. Alternatively, delivery in the form of bulk material is possible.

The invention claimed is:

1. A module base unit for a module for a data carrier, the module base unit comprising:

first and second connection plates that comprise an electrically conductive material, wherein the first and second connection plates are aligned with each other to have a common direction of extent, and are separated mechanically and electrically from each other by a generally L-shaped gap having a first section in the direction of extent and a second and a third section transverse to the direction of extent; and a strain relief plate connected to the first and second connection plates, wherein the stress relief plate is formed of one of group consisting of a glass reinforced fiber, an epoxy resin and a metal electrically isolated from the first and second connection plates by an insulating adhesive, and wherein the stress relief plate is connected to the first and the second connection plates by structure such that the strain relief plate absorbs tensile forces occurring parallel to the direction of extent and acting on the first and second connection plates.

2. The module base unit of claim 1, wherein the at least one planar strain relief member is connected to the two connection plates in an interlocking manner.

3. The module base unit of claim 1, wherein the at least two extensions of the at least one planar strain relief member are connected to the first and second connection plates in an interlocking manner.

4. The module base unit of claim 1, wherein a chip is electrically connected to the first and second connection plates of the module base unit.

5. The module base unit of claim 1, wherein each of the two connection plates consists substantially of copper covered with a layer of tin.

6. A module base unit for a module for a data carrier, the module base unit comprising:

a first connection plate and a second connection plate, each comprising an electrically conductive material, wherein the first and the second connection plates each have a direction of extent, are aligned relative to each other with their respective directions of extent, and are separated mechanically and electrically from each other by a gap transverse to the two directions of extent; and two planar strain relief strips, each planar strain relief strip having at least two tabs projecting transversely to the plane of the two planar strain relief strips, one of the two tabs connected to the first connection plate and one of the two tabs connected to the second connection plate, wherein the two planar strain relief strips absorb tensile forces occurring parallel to the directions of extent and acting on the first and second connection plates.

7. The module base unit of claim 6, wherein each of the first and the second connection plates consists substantially of copper covered with a layer of tin.

8. The module base unit of claim 6, wherein the two planar strain relief strips comprise a fiber-reinforced plastics material.

9. The module base unit of claim 6, wherein the two planar strain relief strips comprise an epoxy resin.

10. The module base unit of claim 6, wherein the two planar strain relief strips comprise a metal, wherein the metal is electrically isolated from the first and second connection plates by an insulating adhesive.

11. A module base unit for a module for a data carrier, the module base unit comprising:

a first connection plate and a second connection plate, each comprising an electrically conductive material, wherein the first and the second connection plates each have a direction of extent, are aligned relative to each other with their respective directions of extent, are separated mechanically and electrically from each other by a gap transverse to the two directions of extent, and an upper surface of an end of the first connection plate proximal to the gap; and a planar strain relief ring arranged on the planar support surface, the planar strain relief ring having at least a first pin and a second pin, each projecting transversely to the plane of the planar relief ring, the first pin connected to the first connection plate and the second pin connected to the second connection plate whereby the relief ring absorbs tensile forces occurring parallel to the directions of extent and acting on the first and second connection plates.

12. The module base unit of claim 11, wherein each of the first and the second connection plates consists substantially of copper covered with a layer of tin.

13. The module base unit of claim 11, wherein the planar strain relief ring comprises a fiber-reinforced plastics material.

14. The module base unit of claim 11, wherein the planar strain relief ring comprises an epoxy resin.

15. The module base unit of claim 11, wherein the planar strain relief ring comprises a metal, wherein the metal is electrically isolated from the first and second connection plates by an insulating adhesive.

\* \* \* \* \*